United States Patent
Fujii et al.

(10) Patent No.: US 7,575,544 B2
(45) Date of Patent: Aug. 18, 2009

(54) OIL RECOVERY APPARATUS FOR A ROLL APPARATUS

(76) Inventors: Motoyuki Fujii, c/o Hiroshima Research & Development Center, Mitsubishi Heavy Industries, Ltd., 6-22, Kan-on-shin-machi 4-chome, Nishi-ku, Hiroshima, Hiroshima-ken, 733-8553 (JP); Setsuo Suzuki, c/o Hiroshima Research & Development Center, Mitsubishi Heavy Industries, Ltd., 6-22, Kan-on-shin-machi 4-chome, Nishi-ku, Hiroshima, Hiroshima-ken, 733-8553 (JP); Hidemasa Iijima, c/o Paper & Printing Machinery Division, Mitsubishi Heavy Industries, Ltd., 5007, Itozaki-cho, Mihara, Hiroshima-ken, 729-0393 (JP)

( * ) Notice: Subject to any disclaimer, the term of this patent is extended or adjusted under 35 U.S.C. 154(b) by 592 days.

(21) Appl. No.: 11/002,123

(22) Filed: Dec. 3, 2004

(65) Prior Publication Data

US 2005/0176563 A1 Aug. 11, 2005

(30) Foreign Application Priority Data

Feb. 6, 2004 (JP) ............................. 2004-030933

(51) Int. Cl.
*D21G 1/02* (2006.01)
(52) U.S. Cl. ............................... 492/7; 492/16; 492/20; 162/272
(58) Field of Classification Search ...................... 492/5, 492/7, 16, 20, 46; 162/358.3, 272, 275

See application file for complete search history.

(56) References Cited

U.S. PATENT DOCUMENTS

| 4,741,079 A | 5/1988 | Quehen |
| 5,189,775 A | 3/1993 | Seifert |
| 5,846,173 A | 12/1998 | Grabscheid et al. |
| 5,853,359 A | 12/1998 | Grabscheid et al. |

(Continued)

FOREIGN PATENT DOCUMENTS

DE 44 02 754 6/1994

(Continued)

*Primary Examiner*—David P Bryant
*Assistant Examiner*—Sarang Afzali
(74) *Attorney, Agent, or Firm*—Wenderoth, Lind & Ponack, L.L.P.

(57) ABSTRACT

An oil recovery apparatus for a roll apparatus by which oil inside a roll mantle can be recovered efficiently even when the roll mantle rotates at a high speed. The roll apparatus includes shoe (5) having a contact portion (7) positioned at an upper portion inside a roll mantle (4), and an oil recovery pan (8) for recovering oil (50) entrained inside the roll mantle (4) upon rotation of the roll mantle (4). The oil recovery pan is disposed below the contact portion (7) on an upstream side in the direction of rotation of the roll mantle (4) with respect to the contact portion (7). Further, an outer edge upper end portion (12) of the oil recovery pan (8) extends to a position proximate to the inner circumferential face of the roll mantle (4) within a range in which the outer edge upper end portion (12) does not interfere with an oil film formed from the oil (50) entrained inside the roll mantle (4).

7 Claims, 11 Drawing Sheets

U.S. PATENT DOCUMENTS

| | | |
|---|---|---|
| 5,878,507 A | 3/1999 | Schiel et al. |
| 6,206,813 B1 | 3/2001 | Nikulainen |
| 6,454,685 B1 | 9/2002 | Onnela et al. |
| 2001/0036887 A1 | 11/2001 | Blais et al. |

FOREIGN PATENT DOCUMENTS

| | | |
|---|---|---|
| DE | 19903843 C1 | 7/2000 |
| DE | 101 54 862 | 5/2003 |
| EP | 0687824 A1 | 12/1995 |
| EP | 0857819 A2 | 8/1998 |
| JP | 10-82416 | 3/1998 |
| JP | 2002-525518 | 8/2002 |
| WO | 01/42560 | 6/2001 |

OIL RECOVERY APPARATUS FOR A ROLL APPARATUS

BACKGROUND OF THE INVENTION

1) Field of the Invention

This invention relates to an oil recovery apparatus for a roll apparatus for recovering oil inside a roll mantle.

2) Description of the Related Art

Conventionally, a roll apparatus has been developed which includes a stationary support member, a roll mantle disposed around and rotated on a circumference of the support member, and a shoe supported on the support member for pressing the roll mantle in an outer circumferential direction from the inner circumference side, and is provided typically in a press apparatus or a calendar apparatus of a paper machine.

One of such conventional roll apparatus is equipped with a roll apparatus oil recovery apparatus for recovering oil supplied to the inside of the roll apparatus (refer to Japanese Patent Laid-Open (Kokai) No. HEI 10-82416). FIG. 10 shows the conventional roll apparatus oil recovery apparatus 91 and is a sectional view taken along a plane perpendicular to the roll axial direction of a roll apparatus 90.

Referring to FIG. 10, the roll apparatus 90 includes a center shaft 81, a roll mantle 82 disposed around and rotated on a circumference of the center shaft 81 in the direction indicated by an arrow mark $R_1$ in FIG. 10, and a shoe 84 provided at an upper portion of the center shaft 81 for pressing the roll mantle 82 in an outer circumferential direction from the inner circumference side to press the roll mantle 82 against an opposed roll 83. The roll mantle 82 is driven to rotate by a driving apparatus not shown provided at an axial end portion of the roll mantle 82 while the shoe 84 is driven to move in upward and downward directions by hydraulic fluid supplied into a pressure chamber 86 through a hydraulic fluid supply pipe 85.

In the roll apparatus 90 having such a configuration as described above, oil (lubricating oil) 50 is supplied into the inside of the roll mantle 82 to form an oil film on a contact portion 87 of the shoe 84 with the inner circumferential face of the roll mantle 82 in order to allow the roll mantle 82 to rotate smoothly. However, as the roll mantle 82 rotates, the temperature of the oil 50 gradually rises by frictional heat generated by a shearing work of the oil 50 at the contact portion 87 of the shoe 84 with the inner circumferential face of the roll mantle 82, and this decreases the viscosity of the oil 50, resulting in the possibility that an appropriate oil film may not be formed and consequently the inner circumferential face of the roll mantle 82 may be damaged. Further, the decrease of the viscosity of the oil 50 reduces the life of a rubber cylinder mounted on the surface of the roll mantle 82. Therefore, in order to prevent a temperature rise of the oil 50, after the oil 50 inside the roll mantle 82 is recovered by the roll apparatus oil recovery apparatus 91 upon operation of the roll apparatus 90, the recovered oil 50 is cooled and supplied so as to circulate inside the roll mantle 82.

The conventional roll apparatus oil recovery apparatus 91 includes an oil receiver 88 provided below the contact portion 87 on the upstream side in the direction of rotation of the roll mantle 82 as seen in FIG. 10. The oil 50 entrained inside the roll mantle 82 is not admitted at the most part thereof into the contact portion 87 but flows down naturally by the force of gravity as indicated by an arrow mark $R_2$ in FIG. 10. The oil receiver 88 recovers the oil 50 flowing down by the gravity in this manner. It is to be noted that the oil 50 recovered by the oil receiver 88 is discharged to the outside of the roll mantle 82 through pipes 89, 92 formed in the center shaft 81.

Incidentally, speedup of operation of a paper machine has proceeded in recent years, and also the speed of rotation of the roll mantle 82 has increased remarkably when compared with that in conventional paper machines. Such speedup, however, has given rise to a subject which has not heretofore been imagined.

In particular, since conventionally the speed of rotation of the roll mantle 82 is comparatively low as described hereinabove and the oil 50 flows down as it is from the contact portion 87 to a location below the contact portion 87 as indicated by an arrow mark $R_2$ in FIG. 10 by the gravity, in order to recover the oil 50, only it is necessary to dispose the oil receiver 88 below the contact portion 87. However, when the speed of rotation of the roll mantle 82 becomes high, the oil 50 collides violently with and rebounds from the contact portion 87 as indicated by an arrow mark $R_2'$ in FIG. 11, and reversing current in the form of oil spray is generated over a range on the upstream side in the direction of rotation of the roll mantle 82. Consequently, the amount of oil which can be recovered by the oil receiver 88 decreases significantly.

Particularly, in recent years, a multi-shoe controlled crown roll (M.C.C.R) has been developed wherein the shoe 84 is divided into a plurality of parts in the roll axial direction in the roll mantle 82 and the pressing force of each of the divided parts of the shoe 84 is controlled independently so that the outer profile of the roll mantle 82 in the axial direction can be controlled (crown control). In the M.C.C.R having such a configuration as just described, in order to control the crown profile with a high degree of accuracy, it is significant to assure a high recovery ratio of the oil 50 so that the oil 50 can be supplied always in a well-conditioned state (that is, in a state controlled to an optimum temperature for use) into the inside of the roll mantle 82. Further, in a self loading controlled crown roll (S.L.C.C.R) where upward and downward movements of the entire roll are performed by upward and downward movements of the roll mantle 82 itself, for example, when the roll mantle 82 moves upwardly, the gap between the inner face of the roll mantle 82 and the oil receiver 88 exhibits a greater distance, and this further deteriorates the recovery ratio of the oil 50.

SUMMARY OF THE INVENTION

It is an object of the present invention to provide an oil recovery apparatus for a roll apparatus by which oil inside a roll mantle can be recovered efficiently even when the roll mantle rotates at a high speed.

In order to attain the object described above, according to a first aspect of the present invention, there is provided an oil recovery apparatus for a roll apparatus which includes a stationary support member, a roll mantle disposed around and rotated on a circumference of the support member, and a shoe supported on the support member for pressing the roll mantle in an outer circumferential direction from the inner circumference side, the oil recovery apparatus being provided for the roll apparatus for recovering oil inside the roll mantle, the oil recovery apparatus comprising, the shoe having a contact portion positioned at an upper portion inside the roll mantle, which contact portion is adapted to be in contact with the roll mantle, an oil recovery pan provided below the contact portion, the oil recovery pan being arranged on the upstream side in the direction of rotation of the roll mantle with respect to the contact portion for recovering the oil entrained inside the roll mantle upon rotation of the roll mantle, an outer edge upper end portion of the oil recovery pan extending to a position proximate to the inner circumferential face of the roll mantle within a range within which the outer edge upper end portion does not interfere with an oil film formed from the oil entrained inside the roll mantle. Preferably, the upper portion inside the roll mantle at which the contact portion is positioned is the inner circumferential face of the roll mantle above a horizontal plane including an axial line of the roll mantle.

With the oil recovery apparatus for a roll apparatus, also when the roll mantle rotates at a high speed, the oil which has collided violently with the contact portion and rebounded over a region on the upstream side in the direction of rotation of the roll mantle can be recovered efficiently and with certainty without interference of the oil recovery apparatus for a roll apparatus with the oil film.

Preferably, the outer edge upper end portion of the oil recovery pan is adjustable toward and away from the inner circumferential face of the roll mantle. Preferably, the oil recovery apparatus for a roll apparatus further comprises a contact control means for placing the outer edger upper end portion of the oil recovery pan into and out of contact with the inner circumferential face of the roll mantle.

With the oil recovery apparatus for a roll apparatus, the distance of the outer edge upper end portion of the oil recovery pan to the inner circumferential face of the roll mantle can be adjusted suitably in accordance with the thickness of the oil film. Consequently, possible interference of the oil recovery pan with the oil film can be further reduced, and the oil can be recovered with an improved efficiency.

According to a second aspect of the present invention, there is provided an oil recovery apparatus for a roll apparatus which includes a stationary support member, a roll mantle disposed around and rotated on a circumference of the support member, and a shoe supported on the support member for pressing the roll mantle in an outer circumferential direction from the inner circumference side, the oil recovery apparatus being provided for the roll apparatus for recovering oil inside the roll mantle, the oil recovery apparatus comprising, the shoe having a contact portion positioned at an upper portion inside the roller mantle, which contact portion is adapted to be in contact with the roll mantle, an oil recovery pan provided below the contact portion, the oil recovery pan being arranged on the downstream side in the direction of rotation of the roll mantle with respect to the contact portion for recovering the oil entrained inside the roll mantle upon rotation of the roll mantle, and a scraping blade provided above the oil recovery pan and having an end portion in contact with the inner circumferential face of the roll mantle for scraping off the oil entrained inside the roll mantle and introducing the scraped off oil into the recovery pan. Preferably, the upper portion inside the roll mantle at which the contact portion is positioned is the inner circumferential face of the roll mantle above a horizontal plane including an axial line of the roll mantle.

With the oil recovery apparatus for a roll apparatus, also when the roll mantle rotates at a high speed, the oil can be recovered efficiently.

Preferably, the oil recovery apparatus for a roll apparatus further comprises adjustment means for adjusting pressing force of the end portion of the scraping blade against the inner circumferential face of the roll mantle.

With the oil recovery apparatus for a roll apparatus, by adjusting the pressing force of the end portion of the scraping blade against the inner circumferential face of the roll mantle through the adjustment means, the oil of the oil film on the inner circumference of the roll mantle can be recovered satisfactorily without having a bad influence such as damage on the inner face of the roll mantle.

According to a third aspect of the present invention, there is provided an oil recovery apparatus for a roll apparatus which includes a stationary support member, a roll mantle disposed around and rotated on a circumference of the support member, and a shoe supported on the support member for pressing the roll mantle in an outer circumferential direction from the inner circumference side, the oil recovery apparatus being provided for the roll apparatus for recovering oil inside the roll mantle, the oil recovery apparatus comprising, the shoe having a contact portion positioned at a lower portion inside the roll mantle, which contact portion is adapted to be in contact with the roll mantle, an oil recovery flow path supported on the support member and provided inside the roll mantle, and a siphon flow path having an opening opened on the upstream side with respect to the contact portion in the direction of rotation of the roll mantle for recovering the oil entrained inside the roll mantle upon rotation of the roll mantle through the opening and introducing the recovered oil into the oil recovery flow path making use of a pressure difference. Preferably, the lower portion inside the roll mantle at which the contact portion is positioned is the inner circumferential face of the roll mantle below a horizontal plane including an axial line of the roll mantle.

With the oil recovery apparatus for a roll apparatus, the oil entrained inside the roll mantle can be recovered efficiently by a static pressure generated by damming the oil by means of the contact portion.

Preferably, the oil recovery apparatus for a roll apparatus further comprises an oil introducing flow path for introducing the oil to a location proximate to the opening of the siphon flow path.

With the oil recovery apparatus for a roll apparatus, the oil can be guided so as to be introduced with certainty to the location proximate to the opening of the siphon flow path.

According to a fourth aspect of the present invention, there is provided an oil recovery apparatus for a roll apparatus which includes a stationary support member, a roll mantle disposed around and rotated on a circumference of the support member, and a shoe supported on the support member for pressing the roll mantle in an outer circumferential direction from the inner circumference side, the oil recovery apparatus being provided for the roll apparatus for recovering oil inside the roll mantle, the oil recovery apparatus comprising an oil recovering flow path supported on the support member and provided inside the roll mantle, an oil recovering wedge forming face supported on the support member and disposed so as to gradually approach the inner circumferential face of the roll mantle toward the downstream in a flowing direction of the oil entrained inside the roll mantle upon rotation of the roll mantle, and a communicating flow path having an opening opened to the oil recovering wedge forming face for recovering the oil entrained inside the roll mantle through the opening and introducing the recovered oil into the oil recovering flow path making use of a wedge effect provided by a wedge-shaped space defined by the inner circumferential face of the roll mantle and the oil recovering wedge forming face.

With the oil recovery apparatus for a roll apparatus, also when the roll mantle rotates at a high speed, the oil entrained inside the roll mantle can be recovered efficiently through the opening of the oil recovering wedge forming face making use of a high pressure generated by a wedge-effect provided by the wedge-shaped space defined between the inner circumferential face of the roll mantle and the oil recovering wedge forming face.

Preferably, a gap between the oil recovering wedge forming face and the inner circumferential face of the roll mantle is set, at an upstream portion thereof, greater than or substantially equal to the thickness of an oil film formed from the oil entrained inside the roll mantle, but set, at a downstream portion thereof, smaller than the thickness of the oil film.

With the oil recovery apparatus for a roll apparatus, the oil can be introduced efficiently into the wedge-shaped space defined between the inner circumferential face of the roll mantle and the oil recovering wedge forming face.

The above and other objects, features and advantages of the present invention will become apparent from the following description and the appended claims, taken in conjunction with the accompanying drawings.

DESCRIPTION OF THE PREFERRED EMBODIMENTS

In the following, embodiments of the present invention are described with reference to the drawings.

(A) First Embodiment

Figure 1:
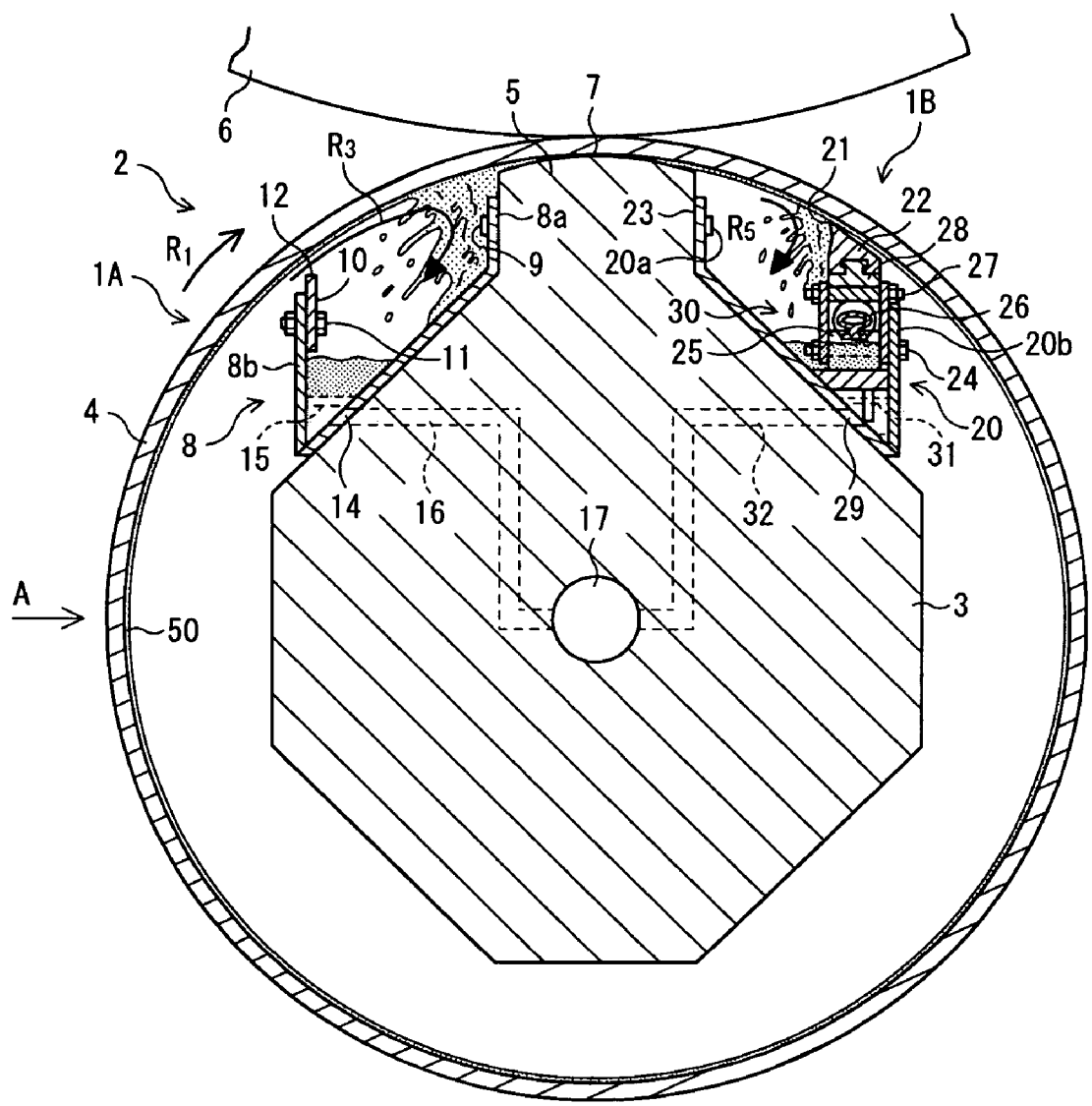
FIG. 1 shows an oil recovery apparatus for a roll apparatus as a first embodiment of the present invention and is a sectional view of a roll apparatus taken along a plane perpendicular to the roll axial direction.
Figure 2:
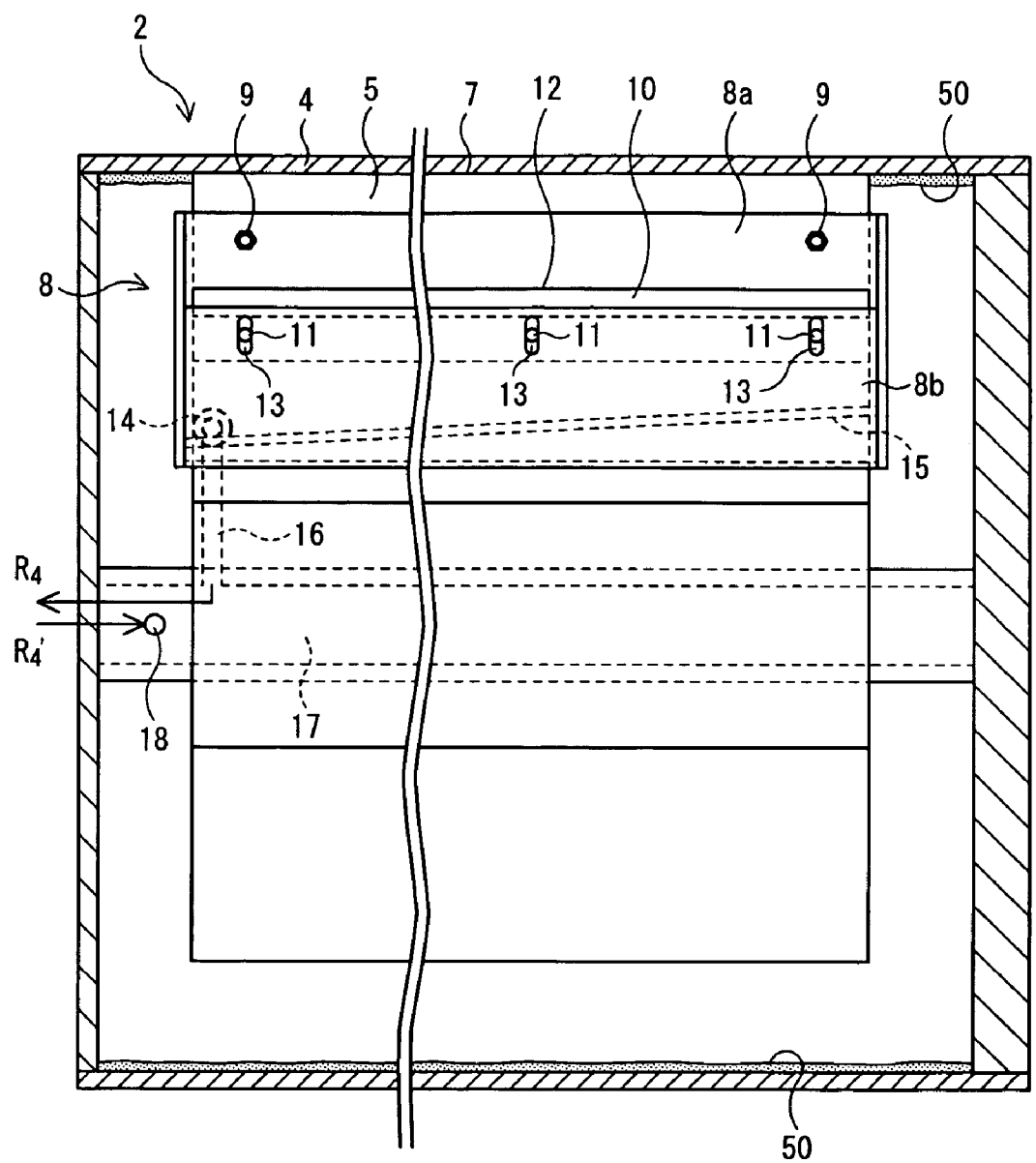
FIG. 2 shows the oil recovery apparatus for a roll apparatus as the first embodiment of the present invention and is a view as viewed in the direction indicated by an arrow mark A of FIG. 1 (with a roll mangle shown in section)

FIGS. 1 and 2 show an oil recovery apparatus for a roll apparatus as a first embodiment of the present invention. More particularly, FIG. 1 is a sectional view of a roll apparatus taken along a plane perpendicular to the roll axial direction, and FIG. 2 is a view as viewed in the direction indicated by an arrow mark A of FIG. 1 (with a roll mangle shown in section). It is to be noted that, in FIG. 1, an arrow mark $R_1$ indicates the direction of rotation of a roll mantle.

A pair of roll apparatus oil recovery apparatus 1A, 1B according to the present embodiment are incorporated in a roll apparatus 2 which is provided typically in a press apparatus or a calendar apparatus of a paper machine. The roll apparatus 2 is described first. Referring particularly to FIG. 1, the roll apparatus 2 includes, as principal components thereof, a stationary center shaft (support member) 3 extending in the roll axial direction (apparatus widthwise direction), a cylindrical roll mantle 4 disposed around an axis of the center shaft 3 in such a manner as to cover the center shaft 3 and driven to rotate by a driving apparatus not shown provided at an axial end portion, and a shoe 5 supported at an upper portion of the center shaft 3 for pressing the roll mantle 4 in a circumferentially outer direction from the inner circumference side.

It is to be noted that the shoe 5 may be divided into a plurality of parts in the roll axis direction such that the pressing force of each of the divisional parts of the shoe 5 may be adjusted independently so as to form the roll apparatus 2 as a multi-shoe type controlled crown roll (M.C.C.R) wherein the outer profile of the roll mantle 4 in the axial direction can be controlled (crown control). Meanwhile, the roll mantle 4 may be of the rotationally driving type which itself receives and is rotated by rotational driving force or may alternatively be of the driven type.

FIGS. 1 and 2 show a model of the roll apparatus 2 to which the roll apparatus oil recovery apparatus 1A, 1B are applied. Accordingly, while, for example, the center shaft 3 is shown having a generally hexagonal shape in FIGS. 1 and 2, the shape of the center shaft 3 is not limited to the specific shape, but the center shaft 3 may have any shape. Further, while a detailed configuration of the shoe 5 is not shown in FIGS. 1 and 2, the shoe 5 may be configured, for example, similarly to the shoe of the prior art described hereinabove. Further, in the present embodiment, the roll apparatus 2 is shown disposed below an opposed roll 6 as seen in FIGS. 1 and 2.

In such a roll apparatus 2 as described above, oil (lubricating oil) 50 is supplied into the inside of the roll mantle 4 to form an oil film on a contact portion 7 in order to reduce the coefficient of friction between the contact portion 7 of the shoe 5 and the inner circumferential face of the roll mantle 4 thereby to allow the roll mantle 4 to rotate smoothly. However, if the speed of rotation of the roll mantle 4 is high, then the oil 50 inside the roll mantle 4 collides violently with the contact portion 7 and rebounds as reversing current in the form of oil spray over a region on the upstream side in the direction of rotation of the roll mantle 4 as indicated by an arrow mark $R_3$ in FIG. 1.

The roll apparatus oil recovery apparatus 1A is configured such that it efficiently recovers the oil 50 after the oil 50 collides violently with the contact portion 7 and rebounds to the upstream side in the direction of rotation as described above. More particularly, the roll apparatus oil recovery apparatus 1A includes an oil recovery pan (first oil recovery pan) 8 provided below the contact portion 7 on the upstream side in the direction of rotation of the roll mantle 4 with respect to the contact portion 7 and serving as an oil receiving pan. The oil recovery pan 8 has an opening formed in a size sufficient to catch substantially all of the oil 50 colliding with and rebounding from the contact portion 7. Further, the oil recovery pan 8 extends in the roll axial direction and is attached at a one side portion 8a thereof to the center shaft 3 by means of bolts 9.

Particularly, as seen in FIG. 1, an oil scattering preventing plate (oil scattering preventing member) 10 is attached to the other side portion 8b of the oil recovery pan 8 and extends in the roll axial direction. The oil scattering preventing plate 10 is attached such that an upper end portion (outer edge upper end portion) 12 thereof is positioned closely to the inner circumference of the roll mantle 4 within a range within which the upper end portion 12 does not interfere with the oil film entrained inside the roll mantle 4. Further, as seen in FIG. 2, bolt holes at the other side portion 8b of the oil recovery pan 8 to which the oil scattering preventing plate 10 is attached are each formed as an elongated hole 13 extending toward the inner circumferential face of the roll mantle 4. Although the thickness of the oil film normally varies depending upon the operation conditions and so forth, since the oil scattering preventing plate 10 can be adjusted toward and away from the inner circumferential face of the roll mantle 4 through such elongated holes 13 as described above, the oil scattering preventing plate 10 can be adjusted to a suitable position corresponding to the thickness of the oil film.

As seen in FIGS. 1 and 2, an oil drain port 14 is formed at a bottom portion of the oil recovery pan 8, and an inclined plate 15 is provided at the bottom portion of the oil recovery pan 8 such that it is inclined in the roll axial direction in order that the oil 50 recovered by the oil recovery pan 8 may be guided readily into the oil drain port 14. Further, a pipe 16 connecting to the oil drain port 14 and another pipe 17 connecting to the pipe 16 and extending in the axial direction of the center shaft 3 for discharging the oil 50 to the outside of the roll apparatus 2 are formed in the center shaft 3. Thus, the oil 50 recovered by the oil recovery pan 8 flows along the inclined plate 15 into the oil drain port 14, passes through the pipe 16 and the pipe 17, and is discharged to the outside of the roll apparatus 2 as indicated by an arrow mark $R_4$ in FIG. 2. It is to be noted that the oil 50 discharged to the outside of the roll apparatus 2 in this manner undergoes suitable processing such as cooling and is thereafter supplied into the roll mantle 4 through an oil supply port 18 formed at an axial end portion of the center shaft 3 and the shoe 5 as indicated by an arrow mark $R_4'$ in FIG. 2.

Meanwhile, as seen in FIG. 1, the roll apparatus oil recovery apparatus 1B includes, as principal components thereof, an oil recovery pan (second oil recovery pan) 20 provided below the contact portion 7 on the downstream side in the direction of rotation of the roll mantle 4 with respect to the contact portion 7 for recovering the oil 50 entrained inside the roll mantle 4 as the roll mantle 4 rotates, and a scraping blade 22 provided above the oil recovery pan 20 and having an end portion 21 held in contact with the inner circumferential face of the roll mantle 4 to scrape off the oil 50 entrained inside the roll mantle 4 and introducing the scraped oil 50 into the oil recovery pan 20.

The oil recovery pan 20 has an opening formed in a size sufficient to catch substantially all of the oil 50 scraped off by the scraping blade 22. Further, the oil recovery pan 20 extends in the roll axial direction and is attached at a one side portion 20a thereof to the center shaft 3 by means of bolts 23.

Meanwhile, the scraping blade 22 extends in the roll axial direction. Further, an adjustment mechanism 30 for adjusting the pressing force of the end portion 21 of the scraping blade 22 against the inner circumferential face of the roll mantle 4 is provided. The adjustment mechanism 30 includes a first support member 25 attached to the inner side of the other side portion 20b of the oil recovery pan 20 by means of bolts 24, a rubber tube 26 attached to an upper portion of the first support member 25, and a second support member 28 attached to an upper portion of the rubber tube 26 by means of bolts 27. The scraping blade 22 is attached to an upper portion of the second support member 28.

Though not shown, bolt holes in the second support member 28 are each formed from an elongated hole extending in the upward and downward directions in FIG. 1, and the bolts 27 are fitted loosely in the bolt holes. Consequently, the second support member 28 can be moved over a distance equal to the length (predetermined distance) of the bolt holes in the upward and downward directions. In particular, the pressure of compressible fluid such as air in the rubber tube 26 is controlled so that the rubber tube 26 may function as an air spring to adjustably support the second support member 28 in the upward and downward directions thereby to resiliently softly press the scraping blade 22 against the inner circumferential face of the roll mantle 4. It is to be noted that the scraping blade 22 is removably mounted on the second support member 28 so that the scraping blade 22 can be replaced readily if the end portion 21 thereof is abraded.

Further, an oil drain port 29 is formed at a bottom portion of the oil recovery pan 20, and an inclined plate 31 is provided at the bottom portion of the oil recovery pan 20 such that it is inclined in the roll axial direction so that the oil 50 recovered by the oil recovery pan 20 may be introduced readily into the oil drain port 29. Further, a pipe 32 connecting to the oil drain port 29 is formed in the center shaft 3 and connected to the pipe 17. Consequently, the oil 50 recovered by the oil recovery pan 20 flows into the oil drain port 29 along the inclined plate 31, passes through the pipe 32 and the pipe 17 and is discharged to the outside of the roll apparatus 2.

The oil recovery apparatus for a roll apparatus as the first embodiment of the present invention is configured in such a manner as described above. Consequently, the roll apparatus oil recovery apparatus 1A can recover also the oil 50, which has collided violently with the contact portion 7 and rebounded over a region on the upstream side in the direction of rotation of the roll mantle 4, efficiently and with certainty without interfering with the oil film formed from the oil 50 entrained inside the roll mantle 4. In short, also when the roll mantle 4 rotates at a high speed, a high oil recovery ratio can be achieved.

Further, with the roll apparatus oil recovery apparatus 1B, since the oil 50 on the inner circumference of the roll mantle 4 is scraped off by the scraping blade 22 which contacts resiliently softly with the inner circumferential face of the roll mantle 4, the oil film on the inner circumference of the roll mantle 4 can be recovered satisfactorily without having a bad influence such as damage on the inner face of the roll mantle 4. Thus, also when the roll mantle 4 rotates at a high speed, the roll apparatus oil recovery apparatus 1B can recover the oil with an improved oil recovery ratio similarly to the effect of the roll apparatus oil recovery apparatus 1A.

It is to be noted that, while, in the present embodiment, both of the roll apparatus oil recovery apparatus 1A and the roll apparatus oil recovery apparatus 1B are provided, also it is possible to provide only one of the roll apparatus oil recovery apparatus 1A and the roll apparatus oil recovery apparatus 1B.

Figure 3:
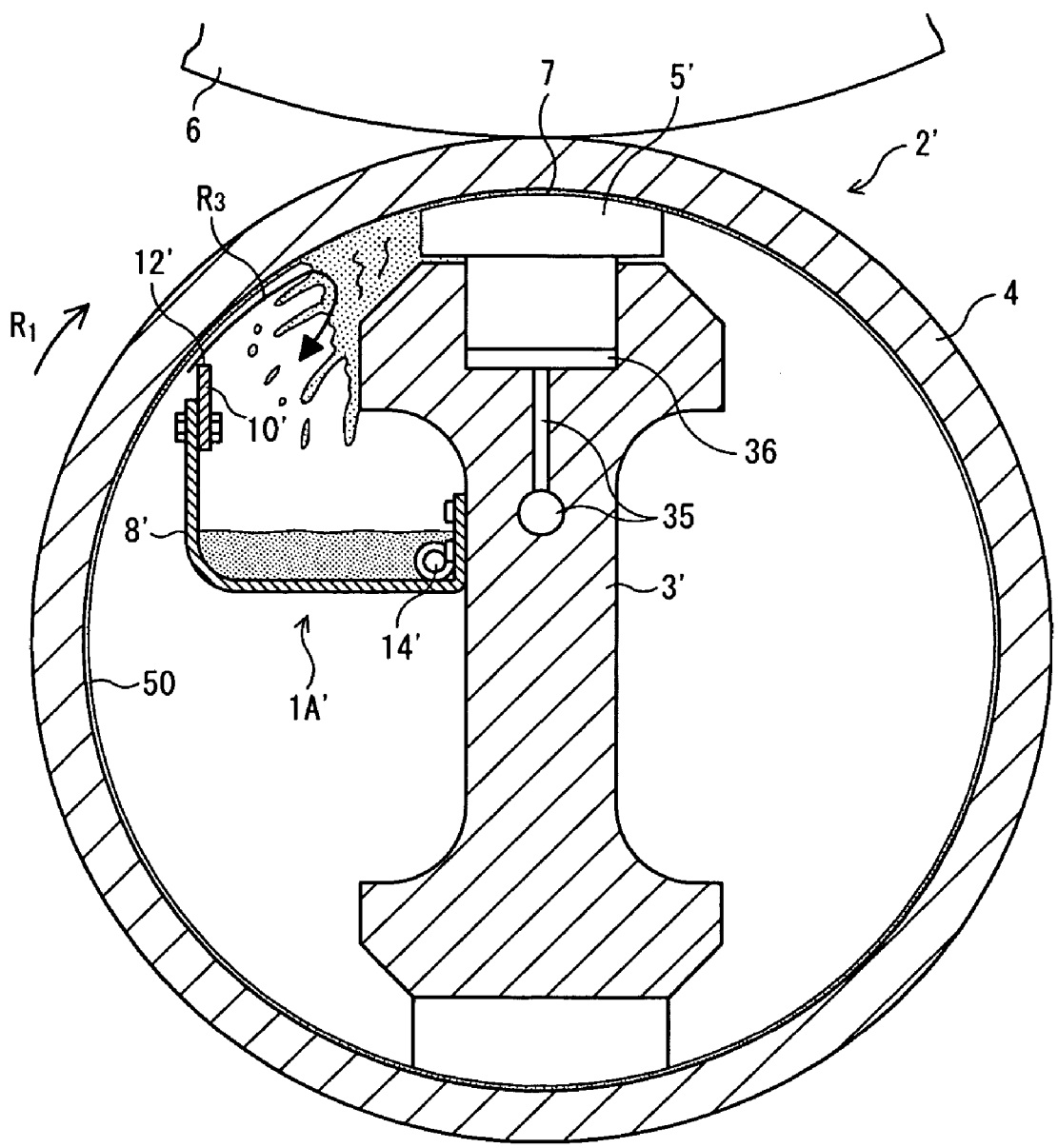
FIG. 3 is a schematic view showing an example wherein the oil recovery apparatus for a roll apparatus according to the first embodiment of the present invention is applied to another roll apparatus.

FIG. 3 shows an example wherein the roll apparatus oil recovery apparatus 1A is applied to a roll apparatus 2' different from the roll apparatus 2 described hereinabove. The roll apparatus oil recovery apparatus 1A' shown in FIG. 3 has a configuration substantially similar to that of the roll apparatus oil recovery apparatus 1A according to the first embodiment described hereinabove. In particular, an upper end portion 12' of an oil scattering preventing plate 10' extends to a position close to the inner circumferential face of the roll mantle 4 within a range within which the upper end portion 12' does not interfere with the oil film. Further, the oil 50 recovered by an oil recovery pan 8' is discharged to the outside of the roll apparatus 2' through an oil drain port 14'. Furthermore, while detailed description of the shoe 5 in the first embodiment is omitted hereinabove, a shoe 5' according to the roll apparatus 2' is driven in the upward and downward directions by hydraulic fluid supplied into a pressure chamber 36 through a hydraulic fluid supply pipe 35. The roll apparatus oil recovery apparatus 1A' can be applied also to the roll apparatus 2' having such a configuration as described above, and a similar effect to that of the first embodiment, that is, an effect that also the oil 50, which has collided violently with the contact portion 7 and rebounded over a region on the upstream side in the direction of rotation of the roll mantle 4, can be recovered efficiently and with certainty can be achieved.

(B) Second Embodiment

Figure 4:
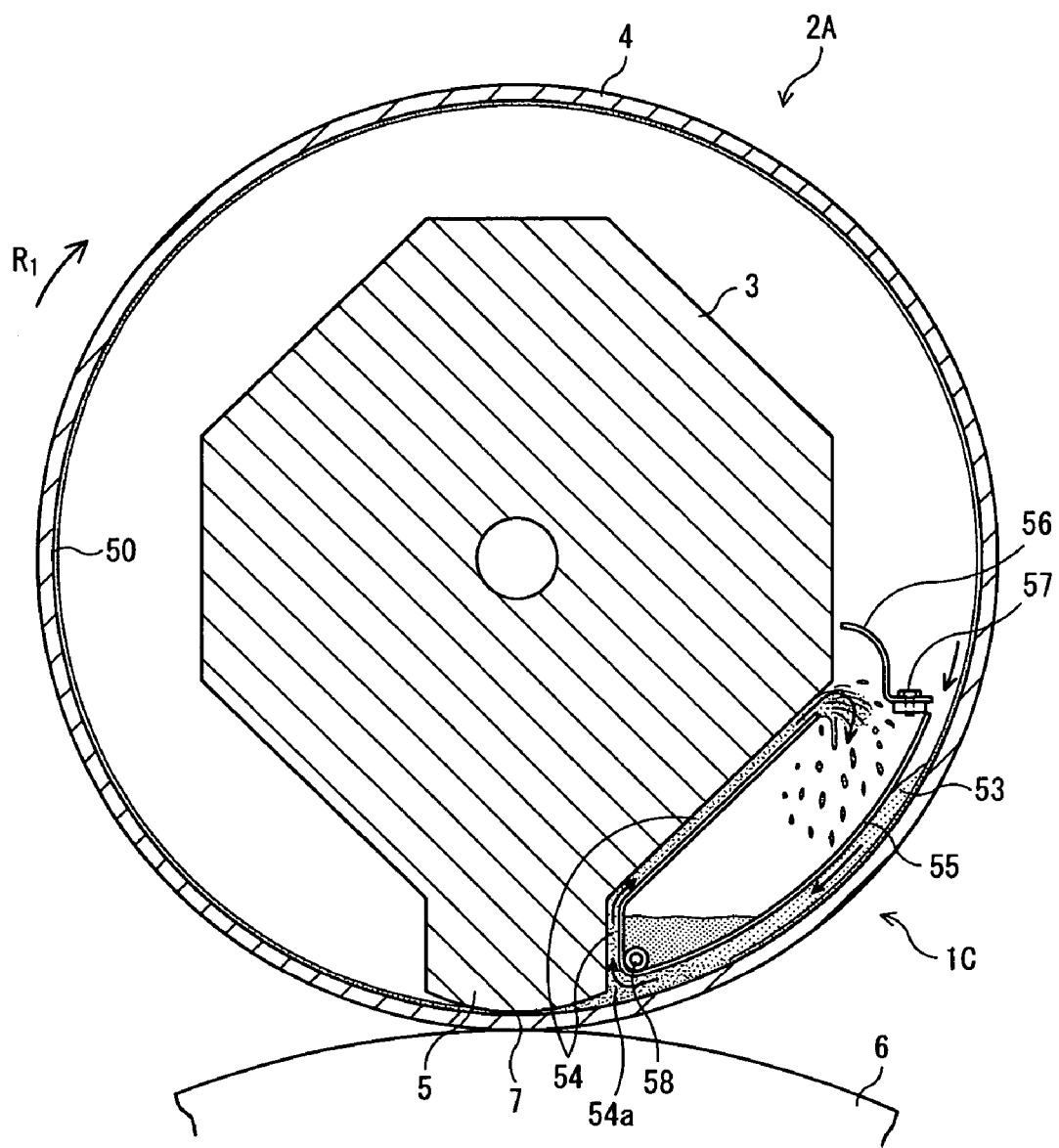
FIG. 4 shows an oil recovery apparatus for a roll apparatus as a second embodiment of the present invention and is a sectional view of a roll apparatus taken along a plane perpendicular to the roll axial direction.

FIG. 4 shows an oil recovery apparatus for a roll apparatus as a second embodiment of the present invention and shows a sectional view of a roll apparatus taken along a plane perpendicular to the roll axial direction. It is to be noted that like portions and elements to those of the first embodiment (FIGS. 1 and 2) described hereinabove are denoted by like reference characters.

The roll apparatus oil recovery apparatus 1C according to the present embodiment is incorporated in a roll apparatus 2A provided above an opposed roll 6. First, description is given of the roll apparatus 2A. Referring to FIG. 4, the roll apparatus 2A includes, as principal components thereof, a stationary center shaft (support member) 3 extending in the roll axial direction (apparatus widthwise direction), a cylindrical roll mantle 4 disposed around an axis of the center shaft 3 in such a manner as to cover the center shaft 3 for being driven to rotate by a driving apparatus not shown provided at an axial end portion of the center shaft 3, and a shoe 5 supported at a lower portion of the center shaft 3 for pressing the roll mantle 4 in a circumferentially outward direction from the inner circumference side. It is to be noted that, in FIG. 4, a model of the roll apparatus 2A to which the roll apparatus oil recovery apparatus 1C is applied is shown. Accordingly, while the center shaft 3 is shown having, for example, a generally hexagonal shape in FIG. 4, the shape of the center shaft 3 is not limited to the specific shape, but the center shaft 3 may have any shape. Further, while a detailed configuration of the shoe 5 is not shown in FIG. 4, the shoe 5 may be configured, for example, similarly to the shoe of the prior art described hereinabove.

In such a roll apparatus 2A as described above, oil (lubricating oil) 50 is supplied into the roll mantle 4 to form an oil film on the contact portion 7 in order to reduce the coefficient of friction between the contact portion 7 of the shoe 5 and the inner circumferential face of the roll mantle 4 thereby to allow the roll mantle 4 to rotate smoothly. However, if the speed of rotation of the roll mantle 4 is high, then the oil 50 inside the roll mantle 4 collides violently with the contact portion 7 and rebounds over a region on the upstream side in the direction of rotation of the roll mantle 4 as described hereinabove.

The roll apparatus oil recovery apparatus 1C is configured such that it efficiently recovers the oil 50 after the oil 50 collides violently with the contact portion 7 and rebounds to the upstream side in the direction of rotation as described above similarly to the roll apparatus oil recovery apparatus 1A according to the first embodiment. More particularly, the roll apparatus oil recovery apparatus 1C includes, as principal components thereof, an oil recovery pan (oil recovery flow path) 55 supported on the center shaft 3 and provided inside the roll mantle 4, a siphon flow path 54 having an opening 54a on the upstream side in the direction of rotation of the roll mantle 4 with respect to the contact portion 7 and utilizing a pressure difference from the pressure inside the roll mantle 4 produced by damming up the oil 50 entrained inside the roll mantle 4 upon rotation of the roll mantle 4 at the shoe 5 to change the dynamic pressure of the oil 50 into static pressure to recover and introduce the oil 50 into the oil recovery pan 55, and an oil introducing flow path 53 for guiding the oil 50 so as to be introduced with certainty to a location in the proximity of the opening 54a of the siphon flow path 54.

The oil recovery pan 55 is disposed on the upstream side in the direction of rotation of the roll mantle 4 with respect to the contact portion 7 and extends in the roll axial direction. Further, the oil recovery pan 55 has faces which extend along the inner circumferential face of the roll mantle 4, a side face of the shoe 5 (a face on the upstream side in the direction of rotation of the roll mantle 4) and a side face of the center shaft 3 (a face on the upstream side in the direction of rotation of the roll mantle 4). The oil introducing flow path 53 is formed from a space defined by the oil recovery pan 55 having such a configuration as described above and the inner circumferential face of the roll mantle 4, and the siphon flow path 54 is formed from another space defined by the oil recovery pan 55, shoe 5 and center shaft 3.

At a position opposing to the exit of the siphon flow path 54, a cover member 56 is provided for preventing scattering of the oil 50 blowing out from the exit of the siphon flow path 54 so that the oil 50 is recovered with certainty into the oil recovery pan 55. The cover member 56 is formed with a length in the axial direction equal to that of the oil recovery pan 55 and attached to the oil recovery pan 55 by means of bolts 57. An oil drain port 58 for discharging the oil 50 recovered by the oil recovery pan 55 to the outside of the roll apparatus 2A is provided in a bottom portion of the oil recovery pan 55. It is to be noted that the oil 50 discharged to the outside of the roll apparatus 2A is supplied into and circulated in the roll mantle 4 after it undergoes a suitable process such as cooling.

The roll apparatus oil recovery apparatus 1C as the second embodiment of the present invention is configured in such a manner as described above. Therefore, the oil 50 entrained inside the roll mantle 4 is introduced on the upstream side in the direction of rotation of the roll mantle 4 with respect to the contact portion 7 into the oil introducing flow path 53 and then dammed by the shoe 5, whereupon the dynamic pressure thereof is converted into a static pressure. Consequently, a pressure higher than the water head pressure of the siphon flow path 54 is generated at the opening 54a, and this pressure causes the oil 50 to flow from the opening 54a of the siphon flow path 54 into and through the siphon flow path 54 until it is recovered into the oil recovery pan 55.

In this manner, according to the roll apparatus oil recovery apparatus 1C, the oil 50 can be recovered efficiently and with certainty without allowing the oil 50 to collide violently with the contact portion 7. In short, also when the roll mantle 4 rotates at a high speed, the roll apparatus oil recovery apparatus 1C can assure a high oil recovery ratio similarly as in the first embodiment.

(C) Third Embodiment

Figure 5A:
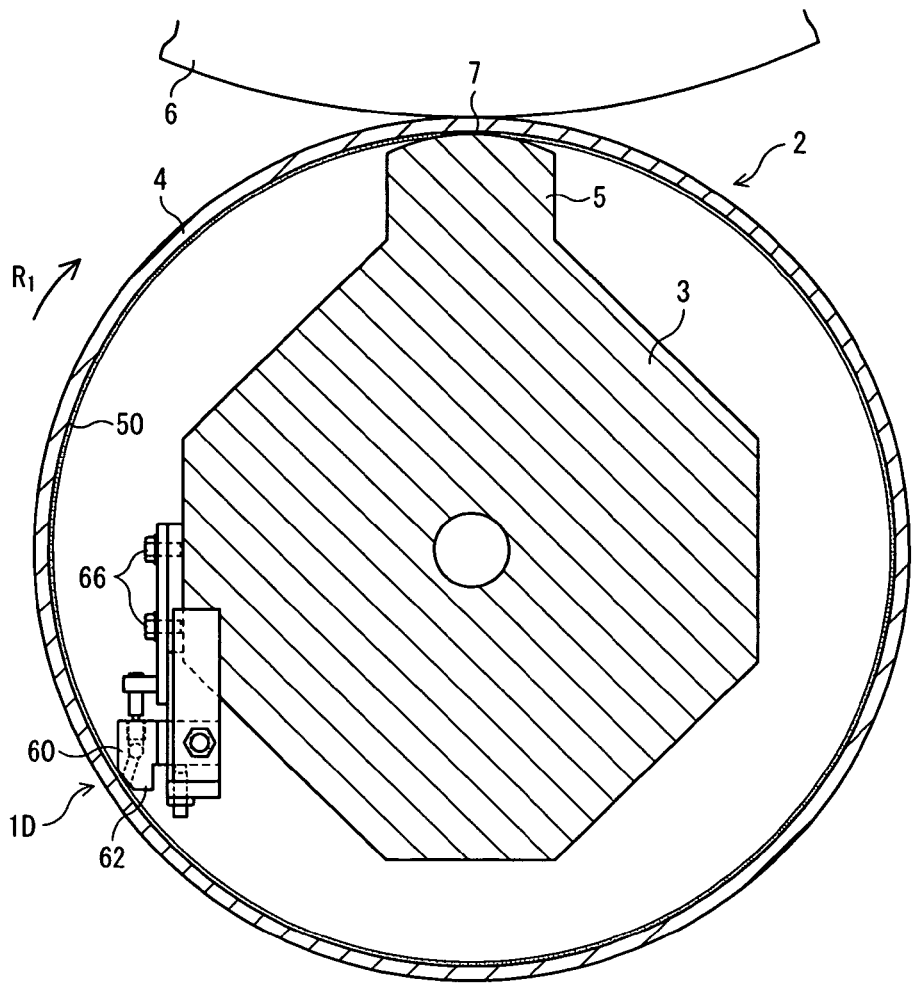
FIG. 5A shows an oil recovery apparatus for a roll apparatus as a third embodiment of the present invention and is a sectional view of a roll apparatus taken along a plane perpendicular to the roll axial direction.
Figure 5B:
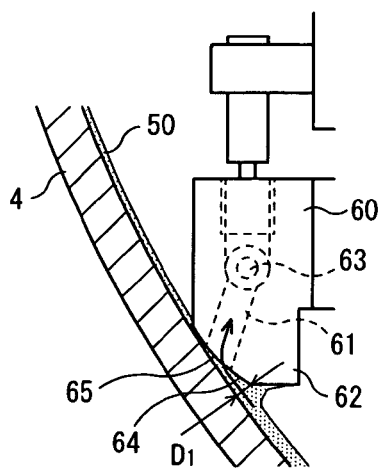
FIG. 5B shows the oil recovery apparatus for a roll apparatus as the third embodiment of the present invention and is an enlarged view of part of the oil recovery apparatus for a roll apparatus.

FIGS. 5A and 5B show an oil recovery apparatus for a roll apparatus as a third embodiment of the present invention, and particularly, FIG. 5A is a sectional view of a roll apparatus taken along a plane perpendicular to the roll axial direction while FIG. 5B is an enlarged view of part of the roll apparatus. It is to be noted that like portions and elements to those of the first embodiment (FIGS. 1 and 2) described hereinabove are denoted by like reference characters.

The roll apparatus oil recovery apparatus 1D according to the present embodiment is incorporated in a roll apparatus 2 provided below an opposed roll 6 similarly as in the first embodiment. The roll apparatus 2 has a configuration similar to that in the first embodiment, and therefore, overlapping description of the configuration of the roll apparatus 2 is omitted herein to avoid redundancy.

As shown in FIG. 5A, the roll apparatus oil recovery apparatus 1D includes an oil recovery member 60 attached to a lower portion of the center shaft 3 on the downstream side in the direction of rotation of the roll mantle 4 by means of bolts 66 and held in contact at an end portion 62 thereof with the inner circumferential face of the roll mantle 4. As shown in FIG. 5B, the oil recovery member 60 extends in the roll axial direction, and an oil recovery flow path 63 is formed inside the oil recovery member 60 and extends in the roll axial direction. Further, the oil recovery flow path 63 is connected to the outside of the roll apparatus 2.

An oil recovering wedge forming face 64 is formed at the end portion 62 of the oil recovery member 60 and disposed such that it gradually approaches the inner circumferential face of the roll mantle 4 toward the downstream in the flowing direction of the oil 50 entrained inside the roll mantle 4 as the roll mantle 4 rotates. A plurality of openings 65 are formed in a juxtaposed relationship in the roll axial direction on the oil recovering wedge forming face 64. Further, communicating flow paths 61 are formed inside the oil recovery member 60 for recovering the oil 50 entrained inside the roll mantle 4 through the openings 65 and introducing the oil 50 into the oil recovery flow path 63 by a wedge effect generated in a wedge-shaped space defined by the inner circumferential face of the roll mantle 4 and the oil recovering wedge forming face 64.

The gap between the oil recovering wedge forming face 64 and the inner circumferential face of the roll mantle 4 is set such that an upstream portion thereof is greater than the thickness of the oil film (that is, greater than or substantially equal to the thickness of the oil film [refer to reference character D1 in FIG. 5B]) while a downstream portion thereof is smaller than the thickness of the oil film (that is, smaller than $D_1$). It is to be noted that the thickness of the oil film here is the thickness of the oil film advancing into the gap described above and is preferably set particularly in accordance with the thickness of the oil film when the roll mantle 4 rotates at a high speed. Further, while it is described above that a plurality of openings 65 are formed along the roll axial direction in the oil recovering wedge forming face 64, naturally a slit-shaped opening may otherwise be formed along the roll axial direction.

The roll apparatus oil recovery apparatus 1D as the third embodiment of the present invention is configured in such a manner as described above. Therefore, the oil 50 entrained inside the roll mantle 4 enters the wedge-shaped space between the oil recovering wedge forming face 64 of the oil recovery member 60 and the inner circumferential face of the roll mantle 4 and is acted upon, in the wedge-shaped space, by pressure generated by the wedge-effect of the wedge-shaped space, whereafter it is recovered into the oil recovery flow path 63 from the openings 65 through the communicating flow paths 61 and then discharged to the outside of the roll apparatus 2 from the oil recovery flow path 63.

In this manner, with the roll apparatus oil recovery apparatus 1D, the oil 50 entrained inside the roll mantle 4 can be recovered efficiently and with certainty making use of the pressure generated by the wedge-effect of the wedge-shaped space defined between the oil recovering wedge forming face 64 of the oil recovery member 60 and the inner circumferential face of the roll mantle 4. In short, also when the roll mantle 4 rotates at a high speed, the roll apparatus oil recovery apparatus 1D can assure an improved oil recovery efficiency similarly as in the first embodiment.

Further, since the gap between the oil recovering wedge forming face 64 and the inner circumferential face of the roll mantle 4 is set such that an upstream portion thereof is greater than the thickness of the oil film while a downstream portion thereof is smaller than the thickness of the oil film, the oil 50 can be introduced smoothly into the wedge-shaped space defined by the inner circumferential face of the roll mantle 4 and the oil recovering wedge forming face 64.

(D) Fourth Embodiment

Figure 6:
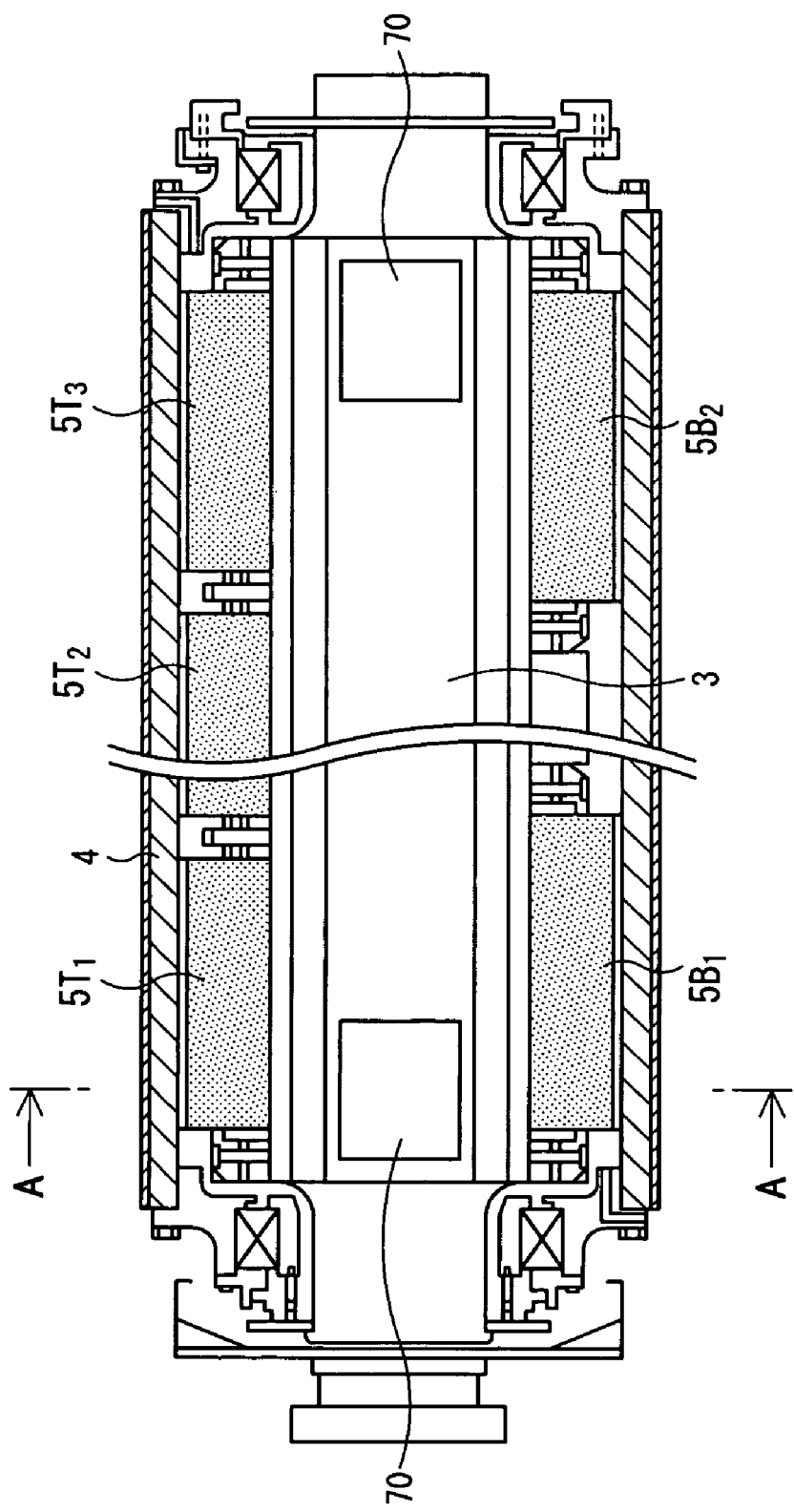
FIG. 6 is an axial sectional view showing an example of a popular S.L.C.C.R (self loading controlled crown roll)
Figure 7:
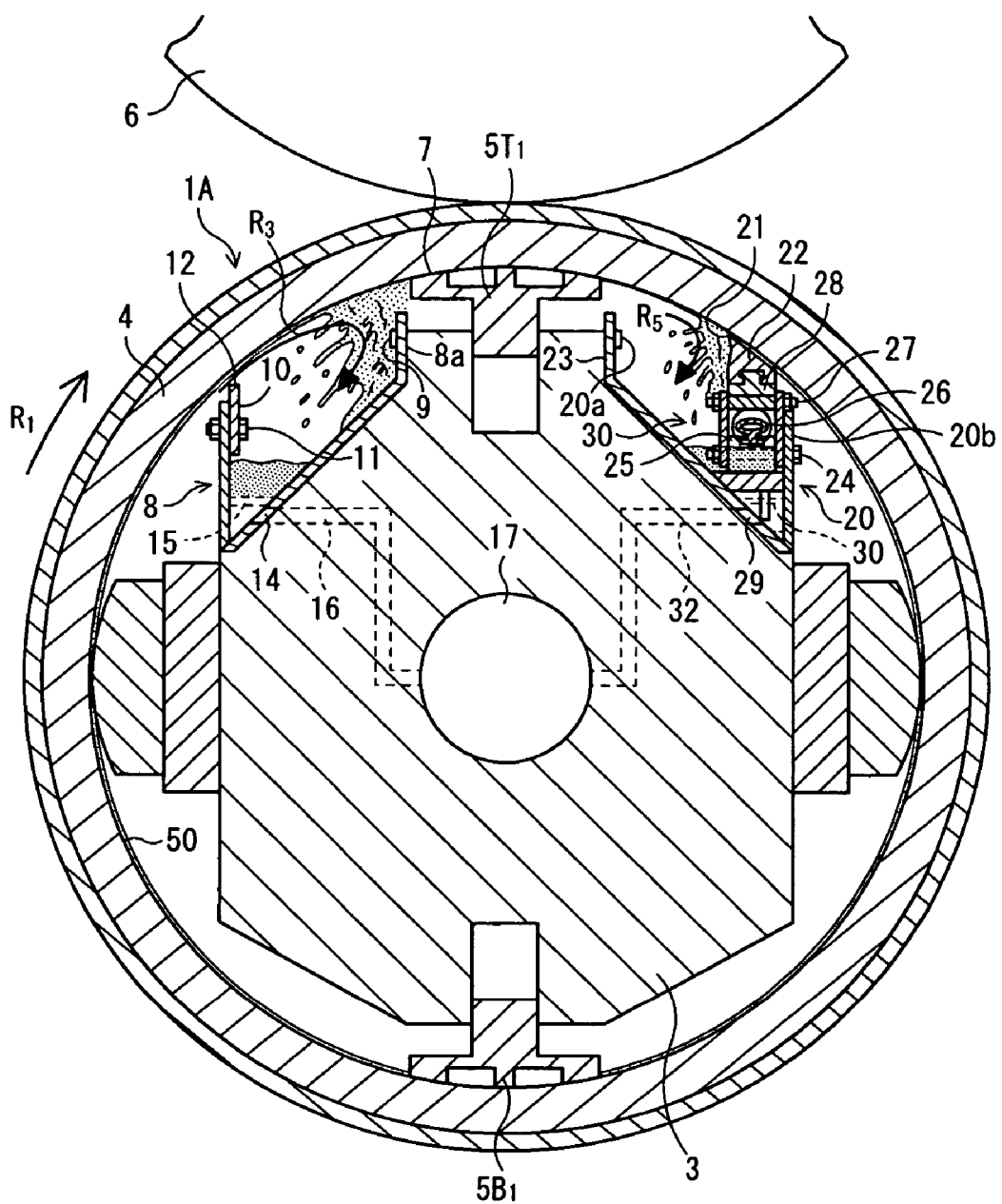
FIG. 7 shows an oil recovery apparatus for a roll apparatus as a fourth embodiment of the present invention and is a sectional view taken along line A-A of FIG. 6.

FIG. 6 is an axial sectional view showing an example of a popular S.L.C.C.R (self loading controlled crown roll), and FIG. 7 shows oil recovery apparatus for a roll apparatus as a fourth embodiment of the present invention and is a sectional view taken along line A-A of FIG. 6. It is to be noted that FIG. 6 shows an S.L.C.C.R disposed below an opposed roll (not shown), and an arrow mark $R_1$ shown in FIG. 7 indicates the direction of rotation of a roll mantle 4. Further, in FIGS. 6 and 7, like portions and elements to those of the first embodiment (FIGS. 1 and 2) described hereinabove are denoted by like reference characters.

Referring first to FIG. 6, the S.L.C.C.R includes a plurality of shoes 5 provided on the opposite upper and lower sides of a center shaft 3. The S.L.C.C.R shown in FIG. 6 particularly includes three shoes $5T_1$, $5T_2$, $5T_3$ provided on the upper side of the center shaft 3 and two shoes $5B_1$, $5B_2$ provided on the lower side of the center shaft 3. In the S.L.C.C.R having the configuration just described, the shoes $5T_1$, $5T_2$, $5T_3$ can be driven hydraulically or the like to move in upward and downward directions separately from one another. As the roll mantle 4 can be moved upwardly or downwardly by the shoes $5T_1$, $5T_2$, $5T_3$ configured in this manner thereby to form a nip between the roll mantle 4 and the opposed roll 6, an arm mechanism for moving the entire roll upwardly and downwardly is not required. Further, by adjusting the pressure distribution to the shoes $5T_1$, $5T_2$, $5T_3$, the pressing force to the roll mantle 4 can be adjusted finely in the roll axial direction, and consequently, a nip pressure variation caused by deflection of the center shaft 3 or a crown shape of the roll mantle 4 can be corrected. Also the shoes $5B_1$, $5B_2$ can be driven hydraulically or the like to move in upward and downward directions separately from each other similarly to the shoes $5T_1$, $5T_2$, $5T_3$.

Where the oil pressure to act upon the shoe $5T_2$ is set higher than the oil pressure to act upon the shoes $5T_1$, $5T_3$ so that the roll mantle 4 has a crown shape (convex shape), the oil pressure to act upon the shoes $5B_1$, $5B_2$ is set higher to drive the shoes $5B_1$, $5B_2$ to move in the downward direction in FIG. 6 so that a load is applied to the opposite axial ends of the roll to apply bending moment, by which a desired crown shape can be obtained. On the other hand, where the oil pressure to act upon the shoe $5T_2$ is set lower than the oil pressure to act upon the shoes $5T_1$, $5T_3$ so that the roll mantle 4 has a discrown shape (concave shape), the oil pressure to act upon the shoes $5B_1$, $5B_2$ is set lower to drive the shoes $5B_1$, $5B_2$ to move in the upward direction in FIG. 6, by which a desired discrown shape can be obtained. Consequently, the nip pressure to the opposed roll 6 can be controlled while preventing the cross sectional shape of the roll mantle 4 from being deformed excessively. It is to be noted that the S.L.C.C.R having such a configuration as described above is used as a center roll of a press apparatus or a calendar roll of a calendar apparatus of a paper machine.

The present oil recovery apparatus for a roll apparatus are applied to the S.L.C.C.R having such a configuration as described above and have configurations similar to those of the roll apparatus oil recovery apparatus 1A, 1B described hereinabove in connection with the first embodiment. In particular, as shown in FIG. 7, a roll apparatus oil recovery apparatus 1A extending in the roll axial direction is attached to the upstream side in the direction of rotation with respect to the shoe $5T_1$, and another roll apparatus oil recovery apparatus 1B extending in the roll axial direction is attached to the downstream side in the direction of rotation with respect to the shoe $5T_1$.

In this manner, the roll apparatus oil recovery apparatus 1A and the roll apparatus oil recovery apparatus 1B can be applied also to the S.L.C.C.R and can recover also the oil 50, which has collided violently with the contact portion 7 and rebounded over a region on the upstream side in the direction of rotation of the roll mantle 4, efficiently and with certainty without interfering with the oil film formed from the oil 50 entrained inside the roll mantle 4. In short, also when the roll mantle 4 rotates at a high speed, a high oil recovery ratio can be achieved. Further, since the oil 50 on the inner circumference of the roll mantle 4 is scraped off by the scraping blade 22 which contacts resiliently softly with the inner circumferential face of the roll mantle 4, the oil on the inner circumference of the roll mantle 4 can be recovered satisfactorily without having a bad influence such as damage on the inner face of the roll mantle 4. Thus, also when the roll mantle 4 rotates at a high speed, the oil can be recovered with an improved oil recovery ratio similarly to the effect of the roll apparatus oil recovery apparatus 1A.

Figure 8:
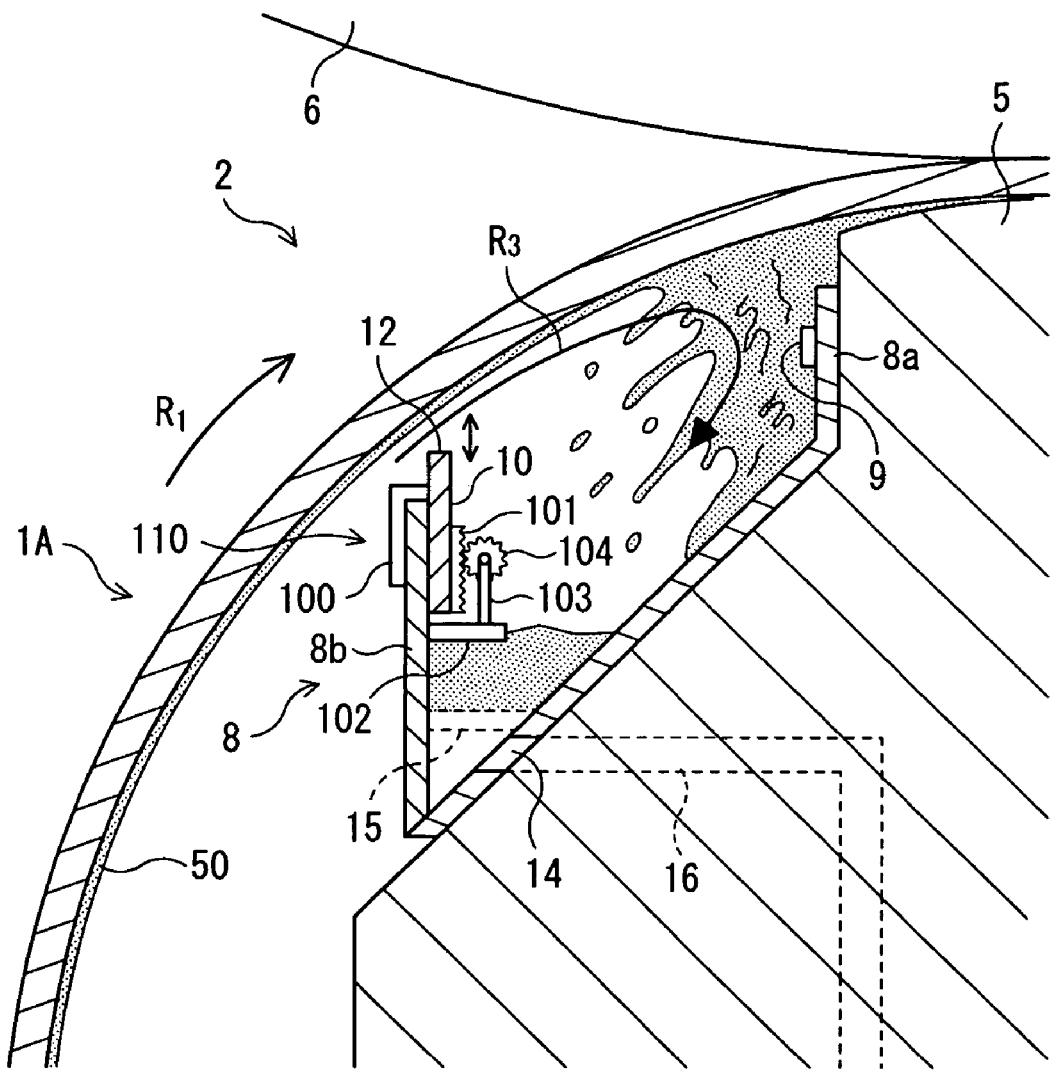
FIG. 8 is a schematic view showing a contact control apparatus according to the fourth embodiment of the present invention.
Figure 9:
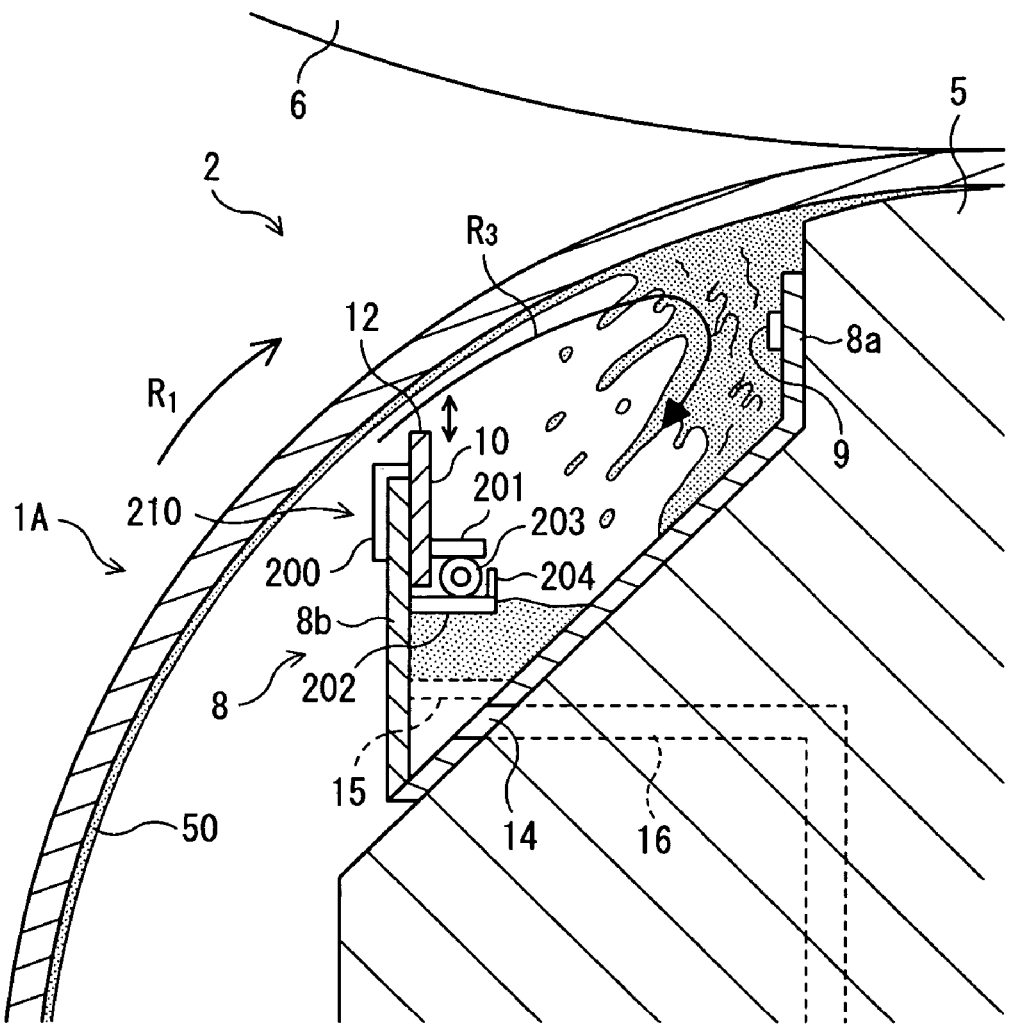
FIG. 9 is a similar view but showing another contact control apparatus according to the fourth embodiment of the present invention.
Figure 10:
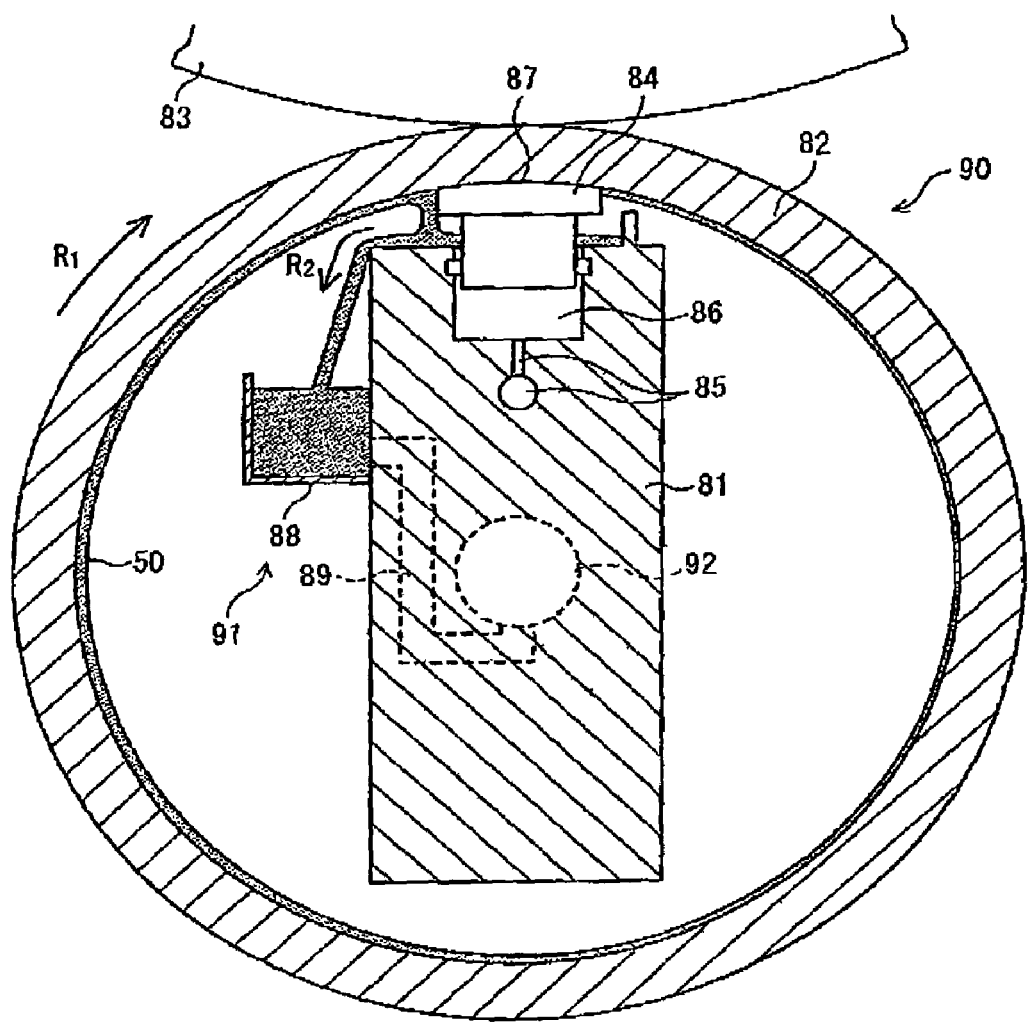
FIG. 10 shows a conventional oil recovery apparatus for a roll apparatus and is a sectional view of a roll apparatus taken along a plane perpendicular to the roll axial direction.
Figure 11:
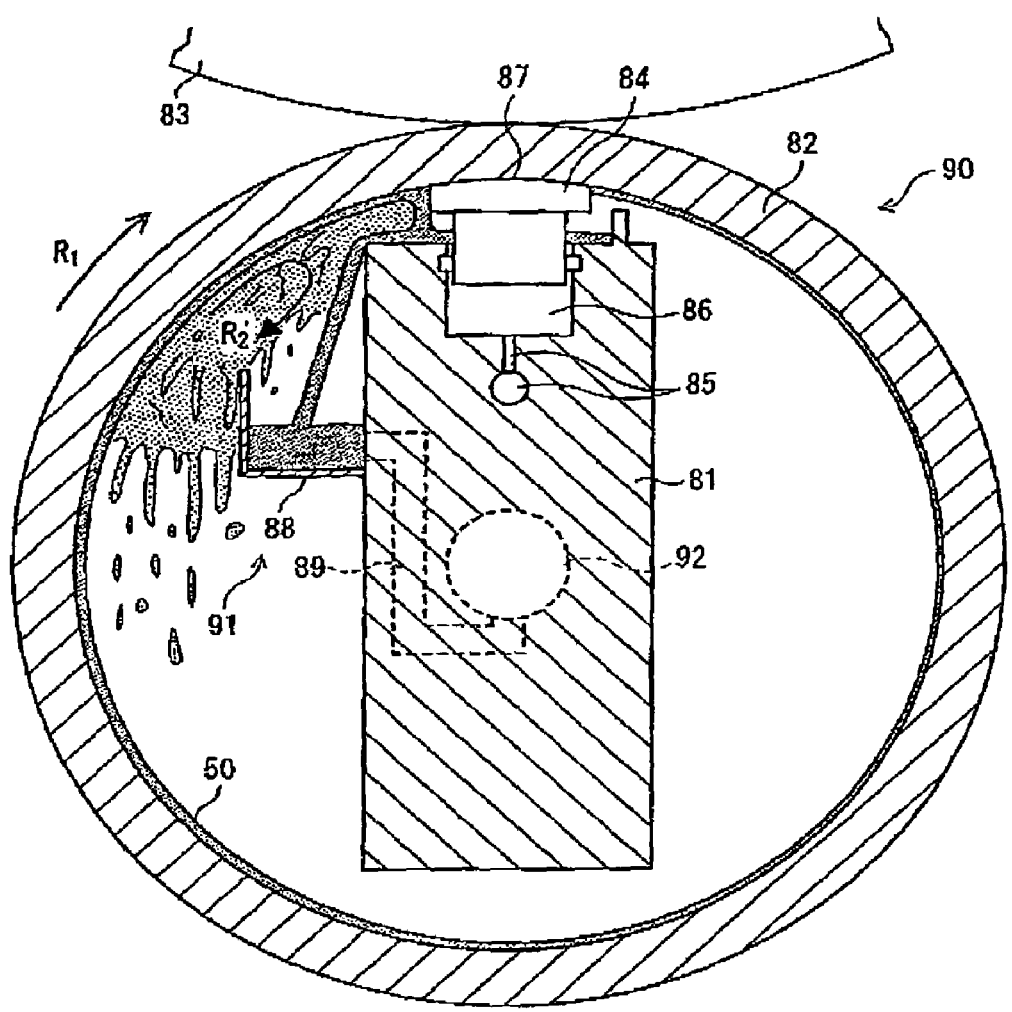
FIG. 11 is a schematic view illustrating a subject of the conventional oil recovery apparatus for a roll apparatus.

It is to be noted that, while, in the S.L.C.C.R, the gap between the oil scattering preventing plate 10 of the roll apparatus oil recovery apparatus 1A and the roll mantle 4 sometimes becomes greater as the roll mantle 4 moves upwardly or downwardly or the crown shape changes, since the oil scattering preventing plate 10 is provided, the oil recovery ratio can be improved when compared with the prior art. Further, in this instance, a contact control apparatus (contact control means) for moving the oil scattering preventing plate 10 into and out of contact with the roll mantle 4 may be provided to adjust the distance of the oil scattering preventing plate 10 from the roll mantle 4. Where the configuration just described is employed, the oil recovery ratio can be improved with a higher degree of certainty. For example, as shown in FIG. 8, a contact control apparatus 110 is provided which includes a guide 100 secured to the oil scattering preventing plate 10 for engaging with the other side portion 8b of the oil recovery pan 8, one or a plurality of racks 101 secured to the oil scattering preventing plate 10, a support base 102 secured to the other side portion 8b of the oil recovery pan 8, support posts 103 provided uprightly on the support base 102, and a pinion or pinions 104 attached for rotation on the support posts 103 and held in engagement with the rack or racks 101. According to the contact control apparatus 110 having the configuration just described, by rotating the pinion or pinions 104, the oil scattering preventing plate 10 can be slidably moved in upward and downward directions along the other side portion 8b of the oil recovery pan 8, and the upper end portion 12 of the oil scattering preventing plate 10 can be suitably brought into or out of contact with the inner circumferential face of the roll mantle 4. Alternatively, for example, a contact control apparatus 210 may be provided as seen in FIG. 9 which includes a guide 200 secured to the oil scattering preventing plate 10 for engaging with the other side portion 8b of the oil recovery pan 8, a position adjustment plate 201 secured to the oil scattering preventing plate 10, a support base 202 secured to the other side portion 8b of the oil recovery pan 8, and a tube member (for example, a rubber tube) 203 disposed between the position adjustment plate 201 and the support base 202 for expanding and contracting movement by air or oil supplied thereto from the outside. According to the contact control apparatus 210 having the configuration just described, if the air pressure or the oil pressure inside the tube member 203 is adjusted to vary the diameter of the tube member 203, then the oil scattering preventing plate 10 can be slidably moved in an upward or downward direction along the other side portion 8b of the oil recovery pan 8 to suitably place the upper end portion 12 of the oil scattering preventing plate 10 into and out of the inner circumferential face of the roll mantle 4. It is to be noted that, while reference numeral 204 shown in FIG. 9 denotes a holding plate for preventing the tube member 203 from being let off the support base 202, where there is no possibility that the tube member 203 may be let off, the holding plate 204 need not be provided. Further, the configuration of the contact control apparatus is not limited to those described above.

While, in the present embodiment, the roll apparatus oil recovery apparatus 1A, 1B are provided in the S.L.C.C.R, at least one of the roll apparatus oil recovery apparatus 1A, 1B, 1C, 1D may be provided solely or a plurality of ones of them may be provided in combination.

(E) Others

While preferred embodiments of the present invention have been described using specific terms, the present invention is not limited to the embodiments specifically described above, and variations and modifications can be made without departing from the scope of the present invention. For example, the roll apparatus 2 according to the first embodiment may be configured otherwise such that it includes the roll apparatus oil recovery apparatus 1D in addition to the roll apparatus oil recovery apparatus 1A, 1B.

Further, the roll apparatus 2 according to the first embodiment may be configured otherwise such that it includes only the roll apparatus oil recovery apparatus 1A without provision of the roll apparatus oil recovery apparatus 1B but additionally includes the roll apparatus oil recovery apparatus 1D according to the third embodiment.

Furthermore, the roll apparatus 2A according to the second embodiment may be configured otherwise such that it includes the roll apparatus oil recovery apparatus 1D according to the third embodiment in addition to the roll apparatus oil recovery apparatus 1C.

Further, while, in the first and third embodiments described above, the roll apparatus 2 includes the shoe 5 provided at an upper portion of the center shaft 3, where the roll apparatus 2 is configured otherwise such that another shoe is provided also at a lower portion of the center shaft 3, for example, as in the S.L.C.C.R of the fourth embodiment, the roll apparatus oil recovery apparatus 1C according to the second embodiment may be provided on the upstream side in the direction of rotation of the roll mantle 4 with respect to the lower portion of the center shaft 3.

What is claimed is:

1. An oil recovery apparatus for a roll apparatus which includes a stationary support member, a roll mantle disposed around and rotated on a circumference of said support member, and a shoe supported on said support member for pressing said roll mantle in an outer circumferential direction from an inner circumference side, said shoe having a contact portion positioned at an upper portion inside said roll mantle, said contact portion being adapted to be in contact with said roll mantle, said oil recovery apparatus being provided for said roll apparatus for recovering oil inside said roll mantle, said oil recovery apparatus comprising:

a first oil recovery pan extending in an axial direction of the roll mantle and provided below said contact portion, said first oil recovery pan being arranged on an upstream side in the direction of rotation of said roll mantle with respect to said contact portion for recovering the oil entrained inside said roll mantle upon rotation of said roll mantle; and an oil scattering preventing plate attached to an upstream side portion of the first oil recovery pan, the oil scattering preventing plate extending in the axial direction of the roll mantle, wherein an outer edge upper end portion of said oil scattering preventing plate extending to a position proximate to an inner circumferential face of said roll mantle within a range within which said outer edge upper end portion does not interfere with an oil film formed from the oil entrained inside said roll mantle.

2. The oil recovery apparatus as claimed in claim 1, further comprising:

a second oil recovery pan provided below said contact portion and extending in an axial direction of said roll mantel, said second oil recovery pan being arranged on a downstream side of the contact portion in the direction of rotation of said roll mantle for recovering the oil entrained inside said roll mantle upon rotation of said roll mantle; and a scraping blade mounted on a downstream side of said second oil recovery pan, said scraping blade having an end portion in contact with an inner circumferential face of said roll mantle for scraping off the oil entrained inside said roll mantle and introducing the scraped off oil into said recovery pan.

3. The oil recovery apparatus as claimed in claim 2, further comprising an adjustment mechanism for adjusting the pressing force of the end portion of the scraping blade against the inner circumferential face of the roll mantle.

4. The oil recovery apparatus as claimed in claim 2, wherein the adjustment mechanism comprises an air spring including a rubber tube that can be inflated and deflated to adjust the pressing force of the scraping blade.

5. The oil recovery apparatus for a roll apparatus as claimed in claim 3, wherein the upper end portion of said oil scattering preventing plate is adjustable toward and away from the inner circumferential face of said roll mantle.

6. The oil recovery apparatus for a roll apparatus as claimed in claim 1, wherein the upper portion inside said roll mantle at which said contact portion is positioned is the inner circumferential face of said roll mantle above a horizontal plane including an axial line of said roll mantle.

7. The oil recovery apparatus for a roll apparatus as claimed in claim 1, wherein the outer edge upper end portion of said oil scattering preventing plate is adjustable toward and away from the inner circumferential face of said roll mantle.

* * * * *